US012720276B2

(12) United States Patent
Gao

(10) Patent No.: US 12,720,276 B2
(45) Date of Patent: Aug. 25, 2026

(54) SYSTEM AND METHOD FOR LOCATION DETERMINATION USING SIGNAL DIFFERENTIAL

(71) Applicant: Building Robotics, Inc., Oakland, CA (US)

(72) Inventor: Jun Gao, Saratoga, CA (US)

(73) Assignee: Siemens Industry, Inc., Alpharetta, GA (US)

( * ) Notice: Subject to any disclaimer, the term of this patent is extended or adjusted under 35 U.S.C. 154(b) by 880 days.

(21) Appl. No.: 17/819,405

(22) Filed: Aug. 12, 2022

(65) Prior Publication Data

US 2024/0056768 A1 Feb. 15, 2024

(51) Int. Cl.
*H04W 4/029* (2018.01)
*H04B 17/318* (2015.01)
*H04W 4/02* (2018.01)

(52) U.S. Cl.
CPC .......... *H04W 4/029* (2018.02); *H04B 17/318* (2015.01); *H04W 4/023* (2013.01)

(58) Field of Classification Search
CPC ....... H04W 4/029; H04W 4/023; H04W 4/33; H04W 4/021; H04B 17/318; H04B 17/25; G01S 2205/02; G01S 5/02213; G01S 5/0269; G01S 5/0278; G01S 11/06
See application file for complete search history.

(56) References Cited

U.S. PATENT DOCUMENTS 10,764,717 B1 9/2020 Keal
10,827,302 B2 11/2020 Keal
10,976,403 B2 * 4/2021 Nishimura ............ H04W 84/22
(Continued)

FOREIGN PATENT DOCUMENTS

CN 103747419 4/2014
CN 103747419 A * 4/2014

OTHER PUBLICATIONS

Ye, A-yong et al. “A Indoor Locating Method Based On Signal Intensity Difference Value With The Dynamic Linear Interpolation Of,” English Translated (Year: 2014).*
(Continued)

*Primary Examiner* — Wesley L Kim
*Assistant Examiner* — Erkin Abdullaev

(57) ABSTRACT

There is described a system and method for location determination of a beacon tag using signal differential. A first beacon is received at multiple receiving devices. First received signal strength indicator measurements associated with the receiving devices are identified based on the first beacon. A reference point for the beacon tag is established based on the plurality of first received signal strength indicator measurements. A second beacon is received at the receiving devices. The second beacon is received subsequent to the first beacon. Second received signal strength indicator measurements are received at the receiving devices are identified based on the second beacon. A displacement of the beacon tag is determined based on a first order difference of the second received signal strength indicator measurements to the first received signal strength indicator measurements. A location of the beacon tag relative to the reference point is updated based on the displacement.

20 Claims, 15 Drawing Sheets

(56) References Cited

U.S. PATENT DOCUMENTS

| | | | | |
|---|---|---|---|---|
| 2005/0208952 | A1* | 9/2005 | Dietrich | G01S 5/02528 455/456.3 |
| 2010/0090901 | A1* | 4/2010 | Smith | H04W 4/33 342/451 |
| 2010/0214068 | A1* | 8/2010 | Nadkarni | G01S 15/876 340/10.1 |
| 2018/0017660 | A1* | 1/2018 | Roquel | G01S 5/02585 |
| 2018/0109921 | A1* | 4/2018 | Cerchio | G01S 5/02522 |
| 2019/0239025 | A1* | 8/2019 | Keal | H04W 4/021 |
| 2019/0331760 | A1* | 10/2019 | Nishimura | G01S 5/14 |
| 2022/0286805 | A1* | 9/2022 | Vaizman | H04W 24/08 |
| 2024/0159856 | A1* | 5/2024 | Walk | G01S 5/0252 |

OTHER PUBLICATIONS

Ye, A-yong. "A Indoor Locating Method Based On Signal Intensity Difference Value With The Dynamic Linear Interpolation Of". CN-103747419-A, PE2E English translation, (Year: 2014).*

* cited by examiner 300
302
Communications
304
Processor
306
Operation
310
RSSI
Probability
312
I/O Interfaces
318
User Interface
320
Memory
308
RSSI Data
314
Location
Data
316
110
114
112

400
402
Communications
404
I/O Interfaces
418
422
424
426
428
User Interface
420
Power Source
430
Processor
406
Communications
410
Processing
412
Memory
408
Tag Data
414
Signal Data
416
104

930

Distance from Sensor 3 [0 20 9] to Tag's Probmap 40
20
0
50
40
30
20
10
X 1
Y 21
Z 0
10
20
30
40
50

940

Distance from Sensor 33 [50 20 9] to Tag's Probmap

1100
Receive a first beacon
1110
Identify first RSSI measurements
1120
Establish a reference point
1130
Receive a second or subsequent beacon
1140
Identify second RSSI measurements
1150
Determine a displacement
1160
Update a location of the beacon tag
1170
Report updated location to a remote device
1180
Continue tracking beacon tag?
1190
No
1199
Yes
Re-referencing with second received RSSI
1195

1200
1130 or 1160
1210
Generate RSSI probability map
1230
Compute distances from each device to grid points of RSSI probability map
1240
Form array of distance-RSSI correlations
1250
Utilizing lookup table of unique probabilistic relationships
1220
Determine tag location from RSSI probability map
1140 or 1170

SYSTEM AND METHOD FOR LOCATION DETERMINATION USING SIGNAL DIFFERENTIAL

FIELD OF THE INVENTION

This application relates to the field of location determination of beacon tags and, more particularly, to a system for determining a location of a beacon tag within an indoor facility.

BACKGROUND

Building management systems encompass a wide variety of systems that aid in the monitoring and control of various aspects of building operation. Building management systems include security systems, fire safety systems, lighting systems, and heating, ventilation, and air conditioning ("HVAC") systems. HVAC systems control the environmental conditions within a building.

Building management systems may provide "intelligence" about building occupants to facilitate control of the building equipment. That is, based on behavior or predicted behavior of users within the building, the system may provide building operators and maintenance personnel with enhanced environmental, safety, logistical, and/or information control. Such user behavior may include the location of people within particular areas of a building, which may be utilized by the building management system to enhance control of the environmental conditions of the building or optimize the flow of people through the space. The intelligence might extend to assets that are moving in the space with data gathered to optimize the flow of assets, create alerts based on position, count and or time events.

When using a radio frequency ("RF") signal level to determine the location, it is ideal for the RF signal level to be monotonically related to the distance between the beaconing devices and the receiving devices. In reality, there can be many sources of interference that complicate the relationship between the received RF signal level and the distances. Examples of interference include reflection, deflection of the RF signals, multipath, and absorption, such as a beacon travelling through a human body to reach a receiver. Typically, these effects vary slowly compared to the RF signal sampling frequency and, in most situations, can be estimated as constant in a short period of time. For instance, for a person between a receiving device and a beaconing device, the RF signal will pass through his or her body and be attenuated for several seconds with roughly the same attenuation. In contrast, a receiving device in front of the person will not be attenuated by the body's absorption. The noises introduced by interferences to the RF signal are mistakenly treated as a zero-mean normal random noise and reduced by averaging with an overdetermined number of receiving devices. That approach results in a larger location error and often the wrong location. Thus, the performance of conventional systems lacks the precision desired by many building operators.

SUMMARY

In accordance with one embodiment of the disclosure, there is provided a location tracking approach for a building management system ("BMS") that utilizes signal differential. The approach provides a system and method for tracking a beacon tag for operation with a location determination system with enhanced precision. The system manages communications between beacon tags carried by users and receiving devices, such as sensors, positioned within a facility to maximize the performance of the beacon tags. The system may also, or in the alternative, manage communications between devices, such as sensors, positioned within the facility. Differential RF signals are utilized as the measurement signals to a real-time location service ("RTLS") system, instead of the RF signal level itself, to determine the displacement of the beaconing devices at a high-level of precision.

One aspect is a system for location determination of a beacon tag using signal differential comprising an input component and a processor. The input component receives a first beacon at multiple receiving devices and receives a second beacon at the receiving devices. The second beacon is received subsequent to the first beacon. The processor is coupled to the input component. The processor to identifies first received signal strength indicator measurements associated with the receiving devices based on the first beacon and establishes a reference point for the beacon tag based on the first received signal strength indicator measurements. The processor identifies second received signal strength indicator measurements associated with the receiving devices based on the second beacon and determines a displacement of the beacon tag based on a first order difference of the second received signal strength indicator measurements to the first received signal strength indicator measurements. The processor updates a location of the beacon tag relative to the reference point based on the displacement.

Another aspect is a method for location determination of a beacon tag using signal differential. A first beacon is received at multiple receiving devices. First received signal strength indicator measurements associated with the receiving devices are identified based on the first beacon. A reference point for the beacon tag is established based on the plurality of first received signal strength indicator measurements. A second beacon is received at the receiving devices in which, the second beacon is received subsequent to the first beacon. Second received signal strength indicator measurements are received at the receiving devices based on the second beacon. A displacement of the beacon tag is determined based on a first order difference of the second received signal strength indicator measurements to the first received signal strength indicator measurements. A location of the beacon tag relative to the reference point is updated based on the displacement.

The above-described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
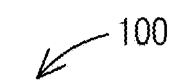
FIG. 1 is an illustration of an environment in an example implementation that is operable to employ techniques described herein.
Figure 1:
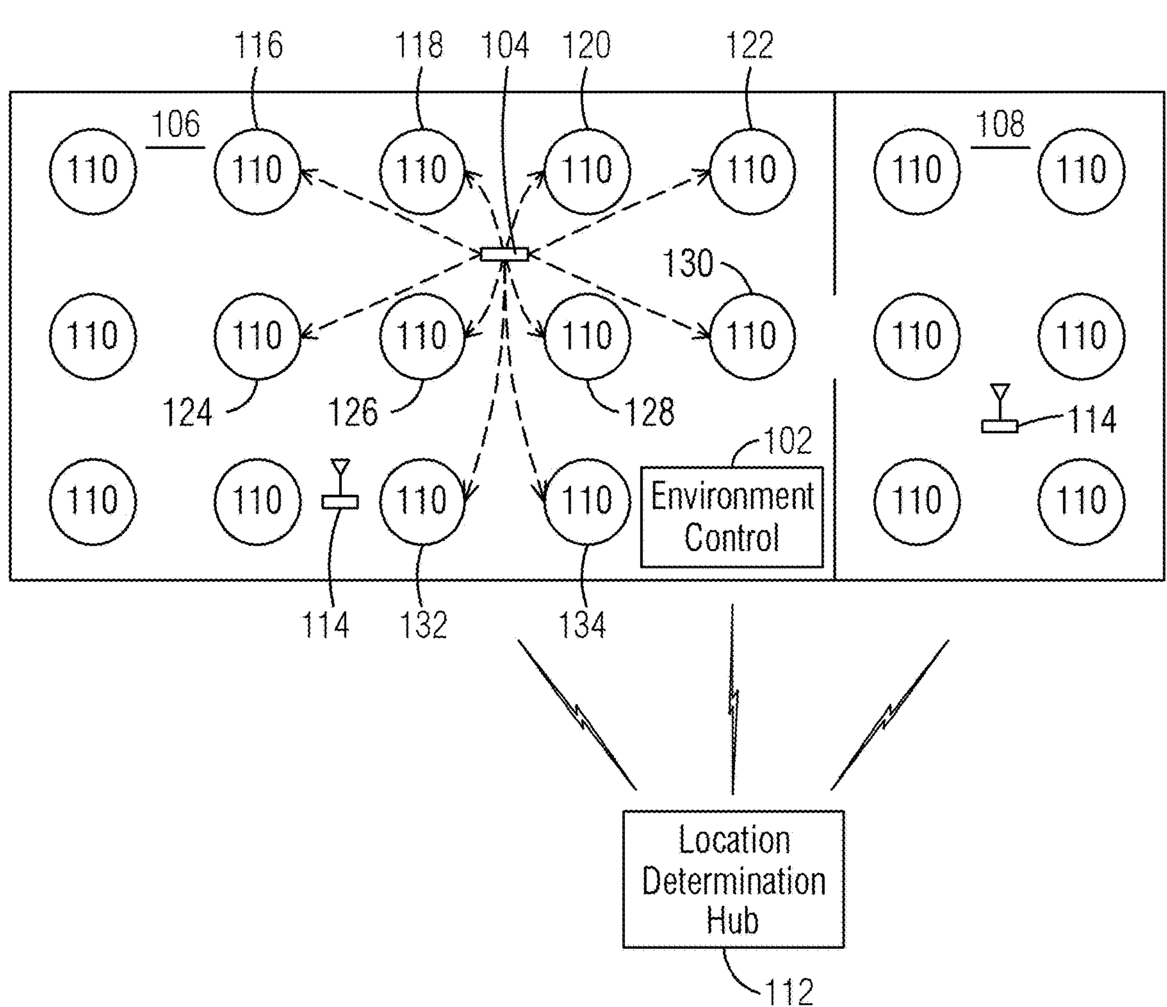

Various technologies that pertain to systems and methods that facilitate location tracking of beacon tags will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The system uses differential RF signals, instead of the RF signal level itself, as the measurement signals to the system, to determine the displacement of beaconing devices. The interference model of the system is a slowly changing model, distinguished from the conventional zero-mean, normal distribution model. The interference distribution may be any nonzero-mean, continuous distribution, and the model changes slowly compared to a sampling frequency. With an initial reference point roughly determined by the RF signal and a robust scheme of updating the reference points, the location of the beaconing device can still be actively tracked in real-time. One advantage is a significant reduction of the mean interference since they are, by and large, canceled out by each other. Another advantage is the differential RF signal measured displacement of the beaconing device in every sampling period. The measurement is the speed of the beaconing device. Therefore, both locations and the speed of the beaconing device may be obtained. Accordingly, overall accuracy of the system is enhanced relative to conventional systems.

Referring to FIG. 1, a location determination system 100 provides information to an environmental control system 102 of the facility so that the environmental control system may manage one or more environmental conditions of the facility. The system may manage the environmental conditions based at least in part on the locations of beacon tags 104, and an occupant or asset associated with the beacon tag. For other embodiments, the location determination system 100 may provide information to other types of systems, such as a building automation system, navigation system, or data analysis system, in the alternative to the environmental control system 102.

The location determination system 100 includes an infrastructure 110, 112, 114 to establish locations of one or more beacon tags 104 within a facility, such as an indoor structure or defined space. The facility may include various partitioned or designated areas 106, 108 of the facility, such as floors, rooms, hallways, or defined open areas associated with the facility. Each area 106, 108 of the facility may include devices of the infrastructure such as one or more receiving devices 110. For some embodiments, a location determination hub 112 of the infrastructure may be co-located with some or all receiving devices within an area 106, 108 of the facility but, for other embodiments, the location determination hub may be remote from the receiving devices and/or the facility. For example, the location determination hub 112 may be located in the Cloud and communicate directly or indirectly with the receiving devices 110, at least in part, via the Internet or other communication network. The location determination hub 112 communicates directly or indirectly with the receiving devices 110 and the interconnection between the location determination hub 112 and the receiving devices may include wired and/or wireless connections. For example, the location determination system 100 may optionally include wired or wireless gateways 114 positioned among the receiving devices 110 at the facility in which the wired or wireless gateways may serve as a communication transponder between the location determination hub 112 and the receiving devices. Similar to the receiving devices 110 and the location determination hub 112, the gateways 114 may also process data to employ techniques described herein.

The receiving devices 110 of the infrastructure may be positioned at fixed locations throughout the area. The receiving devices 110 may be evenly distributed throughout each area 106, 108 or selectively distributed in a non-even manner, as may be preferred for beacon tag detection. The receiving devices 110 are configured to detect beacons broadcast by one or more sources associated with positions of objects, such as living occupants or non-living equipment. In particular, objects may carry or support the beacon tags 104 for detection by the receiving devices 110, among other purposes, to facilitate location detection of the devices. Each of the beacon tags 104 may be any type of transportable device capable of wireless communication with receiving devices 110 of the facility. Examples of beacon tags 104 include, but are not limited to, tags, wearables, wireless communication devices, tablets, portable computing devices, and any other type of transportable device including circuitry for transmitting a beacon.

A beacon tag 104 may broadcast a beacon to receiving devices 116-134 in proximity to the device. For the example shown in FIG. 1, the broadcast beacon transmitted by the beacon tag 112 may be received by the receiving devices 118, 120, 126, 128 located closest to the device. Also, for this example, the broadcast beacon may be received by other receiving devices 116, 122, 124, 130-134, in addition to the closest receiving devices 118, 120, 126, 128, in proximity to the beacon tag 112. The broadcast range of the beacon tag 112 for transmitting the broadcast beacon may be limited by the capabilities of the device, such as power and energy storage, as well as the proximity of the device to the receiving devices 110 in view of distance and any obstructions therebetween. Limitations of the broadcast beacon also include interference such as reflection, deflection of the RF signals, multipath, and absorption, such as a beacon travelling through a human body to reach a receiver.

For at least some embodiments, the location determination system 100 may manage one or more environmental control systems 102 associated with the facility based on the determined locations of the beacon tags 104. In particular, the location determination hub 112 may provide control signals to an environmental control system 102 via a wired connection, wireless connection, or a combination of wired and wireless connections. The environmental control system 102 may manage an environmental condition of the facility based, in whole or in part, on the locations corresponding to the beacon tags. Environmental conditions managed by the environmental control system 102 include, but are not limited to, heating ventilation air conditioning ("HVAC") conditions, lighting conditions, safety conditions, and security conditions. For example, areas of the facility where occupants are not detected may have lights dimmed or inactivated. Also, an HVAC system associated with a particular area may adjust ambient temperatures based on the occupancy and/or location of occupants as detected by the location determination system 100.

Figure 2:
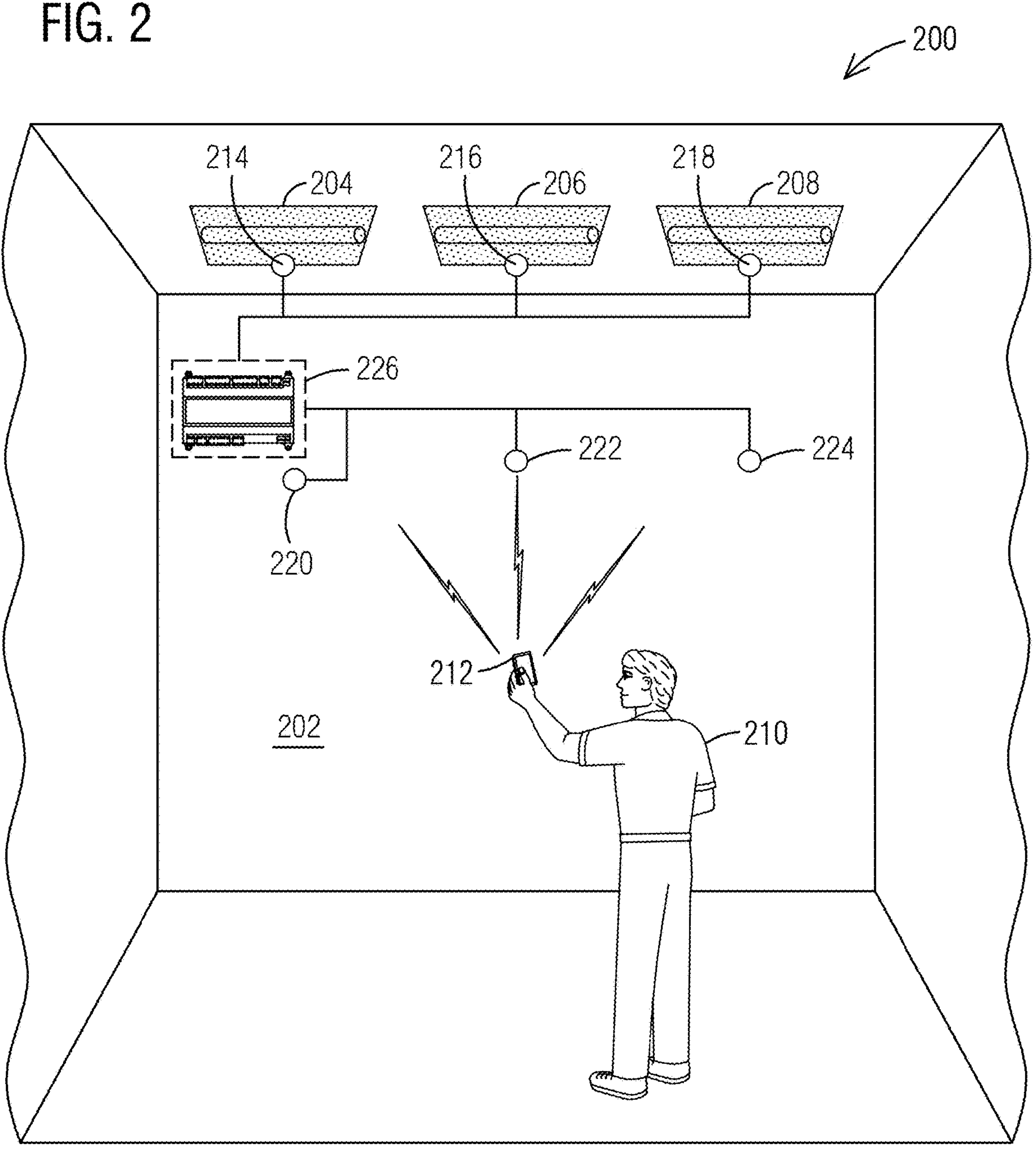
FIG. 2 a cut-away, side planar view of an example area illustrating an aspect of the system described herein, particularly from the view of a user.

Referring to FIG. 2, there is shown an example implementation 200 as applied to an area 202 of the facility to illustrate an aspect of the location determination system 100. For the example implementation 200, environmental devices, such as light fixtures 204-208, are installed at ceiling of the area 202. Examples of environmental devices include, but are not limited to, light fixtures 204-208, air vents, window blinds/shades, smoke detectors, security cameras, and the like. The example implementation 200 also shows an occupant 210 of the facility and a beacon tag 212 associated with the occupant. For example, the beacon tag 212 may be carried, supported, or otherwise co-located with the occupant 210 such that the location of the beacon tag may be associated with the location of the occupant.

In addition to the environmental devices, the area 202 includes receiving devices 214-224 positioned at various locations of the area. For example, as shown in FIG. 1, some receiving devices 214-218 may be fixed or otherwise positioned at a ceiling of the area 202, and other receiving devices 220-224 may be fixed or otherwise positioned at a wall of the area. Also, receiving devices 214-218 may be co-located or adjacent to environmental devices and/or receiving devices 220-224 may be positioned independent of the environmental devices. The location determination system 100 may optionally include one or more wired or wireless gateways 226 positioned among the receiving devices 214-224 at the facility in which each wired or wireless gateways may serve as a communication transponder between the location determination hub 112 and select receiving devices. The receiving devices 214-224 may have locations at the ceiling, walls, and other parts of the area 202 of the facility so that the receiving devices may receive broadcast beacons from beacon tags 212 in proximity to the receiving devices.

Figure 3:
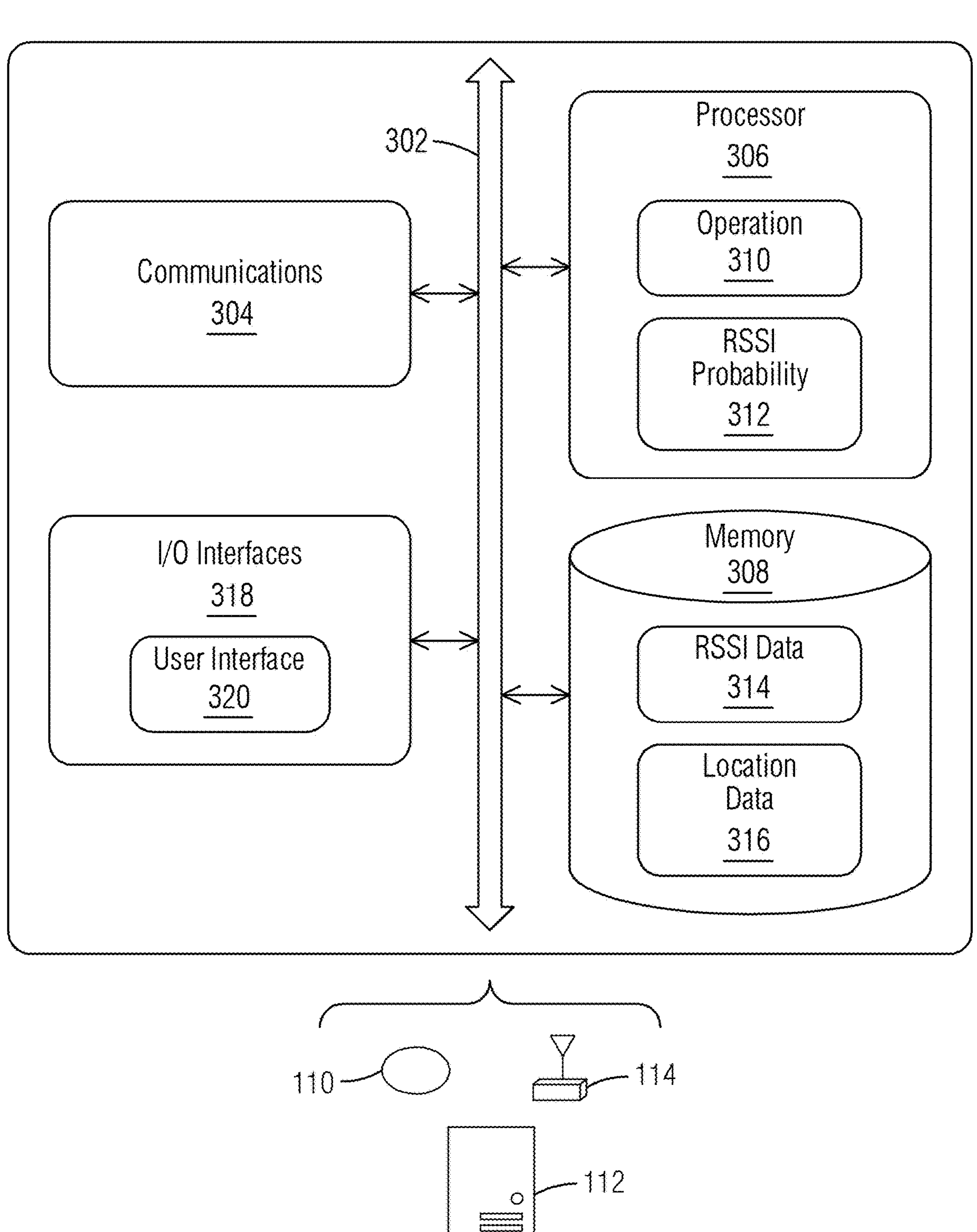
FIG. 3 is a block diagram of an example implementation of an infrastructure device of FIG. 1.

FIG. 3 represents example device components 300 of a system, such as an infrastructure device 110, 112, 114, of the location determination system 100 for tracking beacon tags 104. An example of an infrastructure device includes, but is not limited to, a receiving device 110, a location determination hub 112, or a gateway 114. The device components 300 of the infrastructure device comprise a communication bus 302 for interconnecting the other device components directly or indirectly, one or more communication components 304 communicating with other entities via a wired or wireless network, one or more processors 306, and one or more memory components 308.

The communication component 304 is configured to receive a beacon from a beacon tag, transmits an acknowledgment of the beacon in which the acknowledgment includes the tag instruction, and collect data from one or more infrastructure devices. The communication component 304 may utilize wireless technology for communication, such as, but are not limited to, ultrawide band (UWB), Bluetooth (including BLE), Wi-Fi (including Wi-Fi Direct), Zigbee, Z-Wave, 6LoWPAN, Near-Field Communication, other types of electromagnetic radiation of a radio frequency wave, light-based communications (including infrared), acoustic communications, and any other type of peer-to-peer technology. For some embodiments, the communication component 304 of the device components 300 may also utilize wired technology for communication, such as transmission of data over a physical conduit, e.g., an electrical cable or optical fiber cable.

The processor 306 may execute code and process data received other components of the device components 300, such as information received at the communication component 304 or stored at the memory component 308. The code associated with the location determination system 100 and stored by the memory component 308 may include, but is not limited to, operating systems, applications, modules, drivers, and the like. An operating system includes executable code that controls basic functions of the infrastructure device, such as interactions among the various components of the device components 300, communication with external devices via the communication component 304, and storage and retrieval of code and data to and from the memory component 308.

Each application includes executable code to provide specific functionality for the processor 306 and/or remaining components of the infrastructure device. Examples of applications executable by the processor 306 include, but are not limited to, an operation module 310 to determining a reference point and displacements of the beacon tag based on a first order difference of current RSSI measurements to previous RSSI measurements, and an RSSI probability module 312 to determining a tag location from an RSSI probability map based on the first order difference.

Data stored at the memory component 308 is information that may be referenced and/or manipulated by an operating system or application for performing functions of the infrastructure device. Examples of data associated with the location determination system 100 and stored by the memory component 308 may include, but are not limited to, RSSI data 314 including measurements associated with the receiving devices based on the received beacons and location data 316 including updated location information determined from one or more RSSI probability maps.

The device components 300 of each infrastructure device 110, 112, 114 may include one or more input and/or output components, i.e., I/O interfaces 318. The I/O interfaces 318 of the device components 300 may include one or more visual, audio, mechanical, and/or other components. For some embodiments, the I/O interfaces 318 of each infrastructure device 110, 112, 114 may include a user interface 320 for interaction with a user of the device. The user interface 320 may include a combination of hardware and software to provide a user with a desired user experience. For example, the user interface 332 may include one or more input components to allow the user to enter information, such as mechanical buttons or an audio input, and one or more output components to provide information to the user, such as a visual or audio indicator to show an operational status of the infrastructure device.

The device components 300 may further comprise a power source 334, such as a power supply or a portable battery, for providing power to the other device components 300 of each infrastructure device 110, 112, 114 of the location determination system 100.

It is to be understood that FIG. 3 is provided for illustrative purposes only to represent examples of the device components 300 of an infrastructure device 110, 112, 114 and is not intended to be a complete diagram of the various components that may be utilized by the device. Therefore, infrastructure device 110, 112, 114 may include various other components not shown in FIG. 3, may include a combination of two or more components, or a division of a particular component into two or more separate components, and still be within the scope of the present invention.

Figure 4:
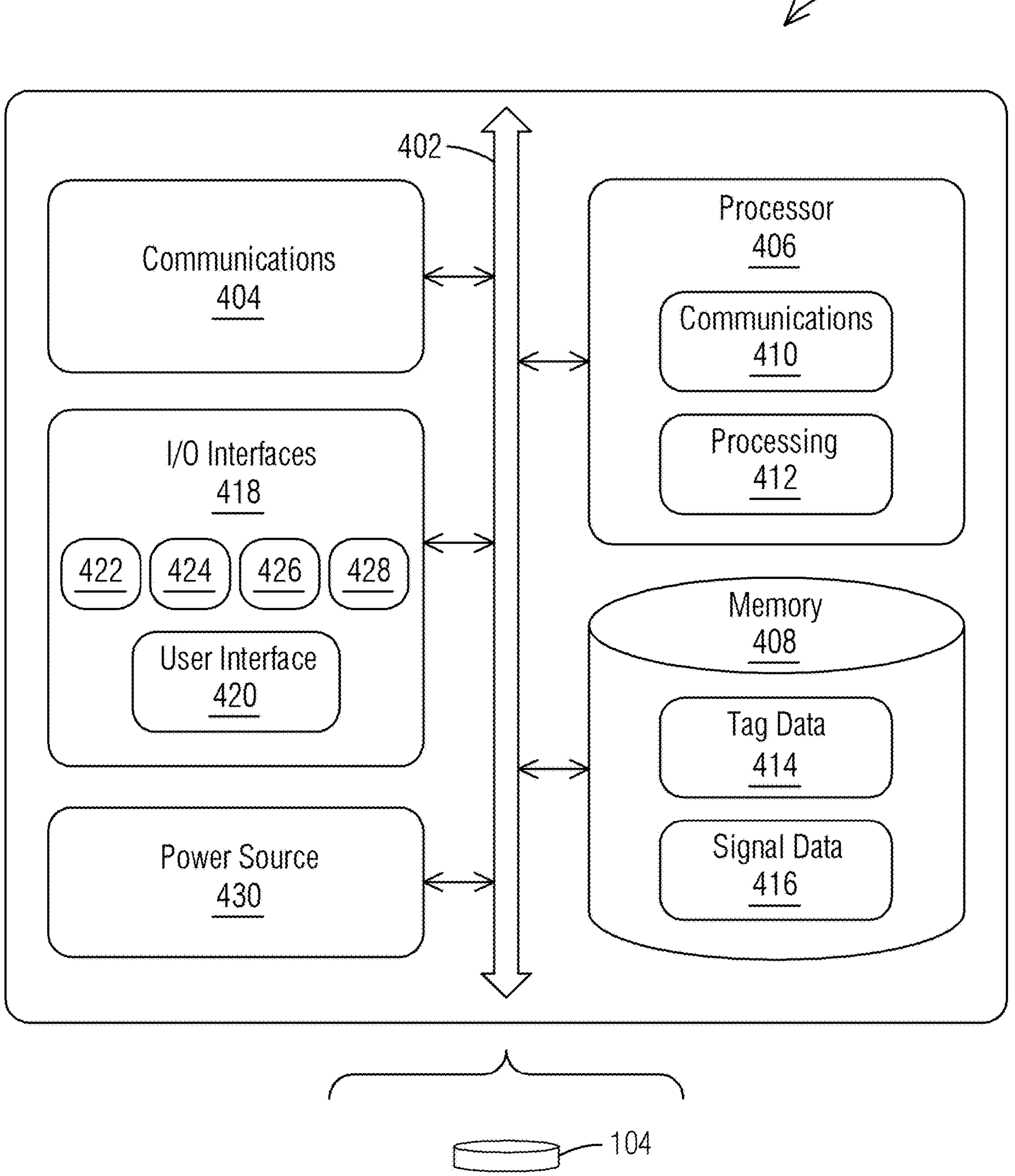
FIG. 4 is a block diagram of an example implementation of a beacon tag of FIG. 1.

FIG. 4 represents example device components 400 of the beacon tag 104 for operating with the location determination system 100. An example of a beacon tag 104 includes, but is not limited to, a tag, a wearable, a wireless communication device, a tablet, a portable computing device, and any other type of transportable device having wireless communication capabilities. The device components 400 of the beacon tag 104 comprise a communication bus 402 for interconnecting the other device components directly or indirectly, one or more communication components 404 communicating other entities via a wired or wireless network, one or more processors 406, and one or more memory components 408.

The communication component 404 may utilize wireless technology for communication. Examples of the wireless technology include, but are not limited to, ultrawide band (UWB), Bluetooth (including BLE), Wi-Fi (including Wi-Fi Direct), Zigbee, Z-Wave, 6LoWPAN, Near-Field Communication, other types of electromagnetic radiation of a radio frequency wave, light-based communications (including infrared), acoustic communications, and any other type of peer-to-peer technology. For some embodiments, the communication component 404 of the device components 400 may also utilize wired technology for communication, such as transmission of data over a physical conduit, e.g., an electrical cable or optical fiber cable.

Each beacon tag 104 may transmit a broadcast beacon in response to signals received from one or more components of the device. For example, the beacon tag 104 may transmit the broadcast beacon in response to a periodic signal from a timing circuit, an activity signal from an internal sensor (such as a motion sensor), an environment signal from an environmental sensor, an external signal from a communication component, or a combination of factors based on information received from more than one component. The signals received from the other component(s) may establish operations to conserve energy, enhance performance, and/or serve other purposes for the beacon tag 104.

The processor 406 may execute code and process data received at other components of the device components 400, such as information received at the communication component 404 or stored at the memory component 408. The code associated with the location determination system 100 and stored by the memory component 408 may include, but is not limited to, operating systems, applications, modules, drivers, and the like. An operating system includes executable code that controls basic functions of the beacon tag 104, such as interactions among the various components of the device components 400, communication with external devices via the communication component 404, and storage and retrieval of code and data to and from the memory component 408.

Each application includes executable code to provide specific functionality for the processor 406 and/or remaining components of the beacon tag 104. Examples of applications executable by the processor 406 include, but are not limited to, a communications module 410 to manage communications of beacons transmitted to and signals received from an infrastructure device 110, 112, 114, and a processing module 412 to process beacons transmitted to and signals received from the infrastructure device 110, 112, 114.

Data is information that may be referenced and/or manipulated by an operating system or application for performing functions of the beacon tag 104. Examples of data associated with the location determination system 100 and stored by the memory component 408 may include, but are not limited to, a tag data 414 having information detected or determined by the beacon tag 104, and a signal data 416 having information associated with the transmitted beacon.

The device components 400 of each beacon tag 104 may further comprise one or more input and/or output components, i.e., I/O interfaces 418. The I/O interfaces 418 of the device components 400 may include one or more visual, audio, mechanical, and/or other components. The I/O interfaces 418 of each beacon tag 104 may comprise a user interface 420 for interaction with a user of the beacon tag 104. The user interface 420 may include a combination of hardware and software to provide a user with a desired user experience. For example, the user interface 420 may include one or more input components to allow the user to enter information, such as mechanical buttons or an audio input, and one or more output components to provide information to the user, such as a visual or audio indicator to show an operational status of the infrastructure device. The I/O interfaces 418 may also manage sensed data received directly or indirectly from other devices or components. Examples of the sensed data managed by the I/O interfaces 418 may include, but are not limited to, lighting 422, motion 424 (such as an accelerometer), temperature 426, imaging 428, and air quality data associated with the infrastructure device.

The device components 400 may further comprise a power source 430, such as a power supply, a portable battery, or energy harvesting component, for providing power to the other device components 400 of each beacon tag 104 of the location determination system 100.

It is to be understood that FIG. 4 is provided for illustrative purposes only to represent examples of the device components 400 of a beacon tag 104 and is not intended to be a complete diagram of the various components that may be utilized by the device. Therefore, beacon tag 104 may include various other components not shown in FIG. 4, may include a combination of two or more components, or a division of a particular component into two or more separate components, and still be within the scope of the present invention.

Figure 5:
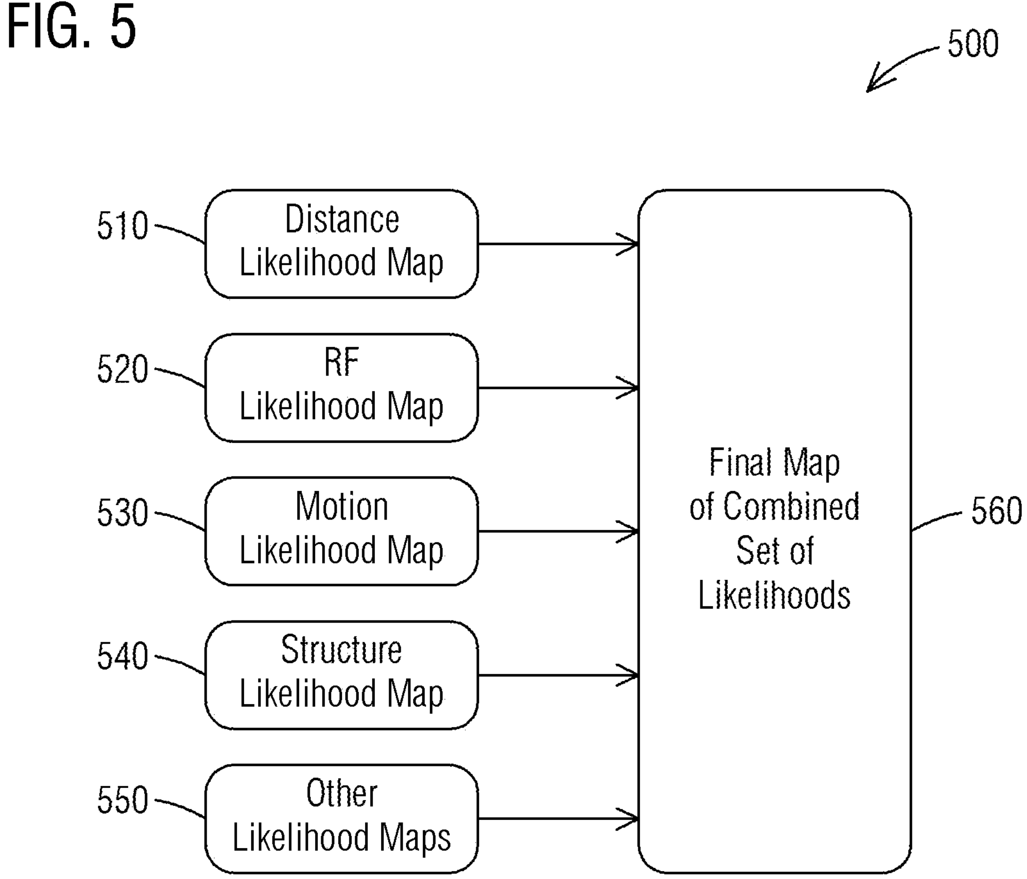
FIG. 5 is a flow diagram of an example implementation of a system for determining a location of a beacon tag by combining multiple likelihood maps.

Referring to FIG. 5, there is illustrated a technique 500 of a location determining system for combining multiple likelihood maps for the purpose of determining a location of a mobile tag within a structure, particularly an indoor structure or an outdoor structure without a positioning system (such as a global positioning system). The technique 500 determines the location of a mobile tag by generating multiple different likelihood maps and combining them to maximize the likelihood of identifying the true location of the mobile tag. Each likelihood map utilizes independent approaches for determining the location of the mobile tag, and the likelihood maps are combined to determine the best location. One example of a likelihood map is a distance likelihood map 510 representing possible paths of the mobile tag and probabilities of the mobile tag taking the possible paths. Another example is a radio frequency ("RF") likelihood map 520 in which multiple RF sensors are distributed throughout one or more areas of the structure and detect RF beacons transmitted by the mobile tag. Yet another example is a motion likelihood map 530 in which multiple motion sensors are distributed throughout one or more areas of the structure and detect movement in proximity to each sensor. Still another example is a structure likelihood map 540 in which the likelihood of a mobile tag's position or movement is based on the location of boundaries and passages within the structure. Other likelihood maps 550, for example distance maps based on acoustic sensors, may be combined with the distance likelihood map 510 and/or one or more of the RF, motion, and structure likelihood maps 520, 530, 540 to determine the most likely location of the mobile tag within the structure.

Any two likelihood maps 510-550 may be combined by the location determining system to generate a final map 560 of combined set of likelihoods. The RF likelihood map described herein is essential since RSSIs are associated with the distances and changes with the tag's location. For this reason, the RF likelihood map may be combined with any or all other likelihood maps. For one embodiment, an RF likelihood map may be combined with a distance likelihood map based on received signal strength indicator ("RSSI") sensors receiving beacons from the mobile tag. For another embodiment, an RF likelihood map may be combined with a motion likelihood map based on passive infrared sensors detecting motion within a structure. Further embodiments include other combinations of the RF likelihood map being combined with one or more other likelihood maps in order to determine the true location of the mobile tag accurately.

Figure 6:
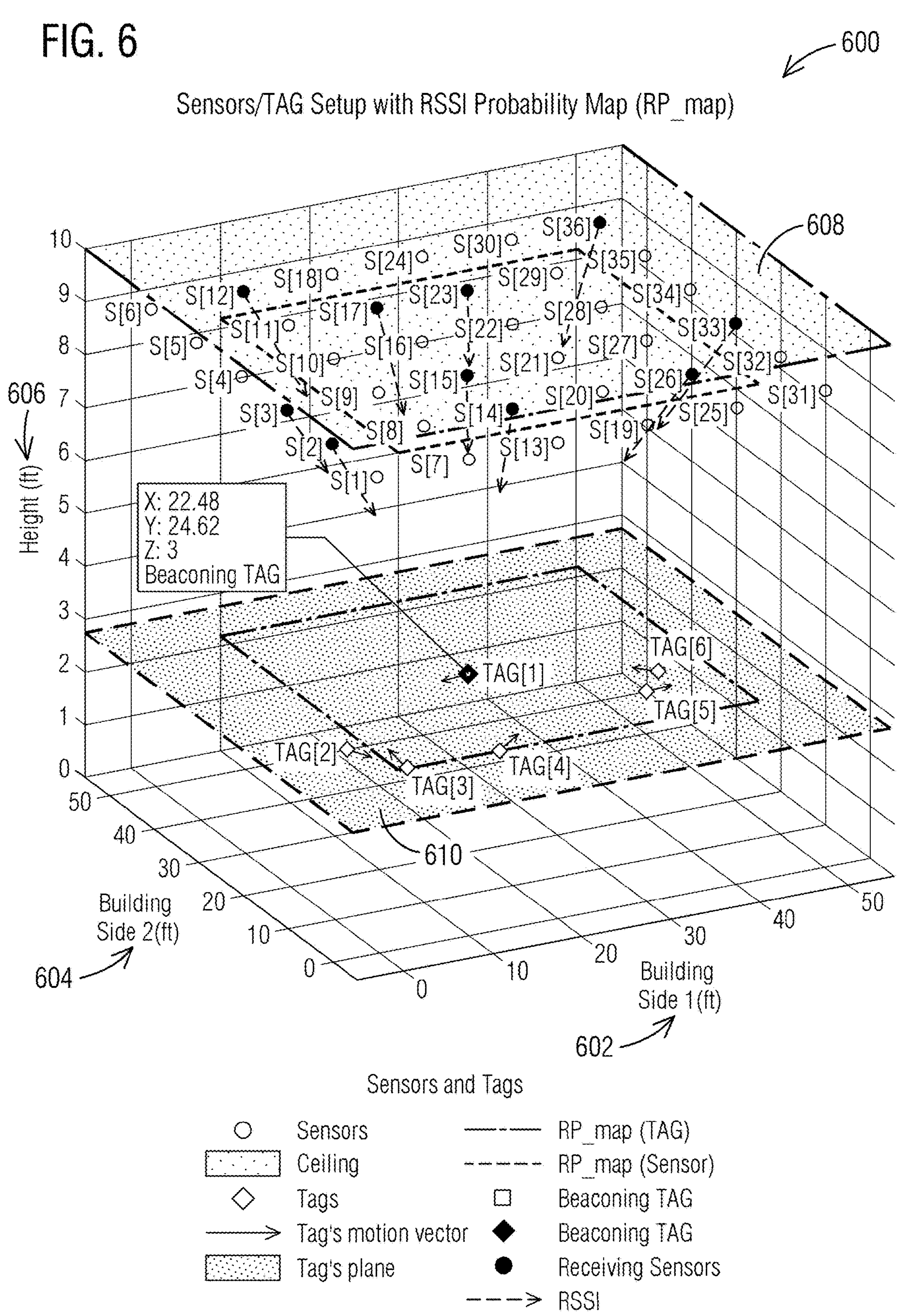
FIG. 6 depicts an example implementation of a receiving device and beacon tag setup in view of an RSSI probability map.

Referring to FIG. 6, there is shown an example implementation of a receiving device and beacon tag setup, i.e., sensor/tag setup 600, to generate an RSSI probability map (i.e., "RP_map"). The graphic view of the sensor/tag setup 600 includes three dimensions, namely a first building side 602, a second building side 604, and a building height 606. These dimensions may be shown in metric or non-metric measurements, such as feet. The sensor/tag setup 600 includes a sensor grid 608 and a tag grid 610. For some embodiments, the receiving devices of the sensor grid 608 may be positioned near a ceiling of a particular floor of the building, which is higher in elevation than tags of the tag grid 610 located closer to the ground within the same area. Although tags may be positioned anywhere within a given area, they are often positioned on movable objects on the ground or carried by occupants. In FIG. 6, there are multiple receiving devices, i.e., S[1] through S[36], represented by the sensor grid 608, and multiple tags, i.e., TAG[1] through TAG[6], represented by the tag grid 610.

Receiving devices S[1] through S[36] of the sensor grid 608 covers a specific area of facility, a beaconing tag (TAG[1]) is located within the area. For the representation shown in FIG. 6, the beaconing tag TAG[1] is located at coordinates 22.48, 24.62, and 3 and transmits a beacon at time $t_n$ with a sequence number M. There may be other tags co-located with the select tag within the area, such as other tags TAG[2]-TAG[6] that are not sending at the time $t_n$. The sequence number M is unique within a specific time and wraps around periodically. The beaconing tag (TAG[1]) is believed somewhere within a beaconing window. For some embodiments, the beaconing window sets around the last known location of the beaconing tag. For some embodiments, the beaconing window may be setup based on other information about the beaconing tag. This beaconing window is referred to as the Received Signal Strength Indicator (RSSI) probability map or RP_map, in which the RSSI is measured in terms of dBm.

The receiving devices S[1] through S[36] of the sensor grid 608 are sensors that report RSSI. The other sensors do not report the RSSI with sequence number M from the beaconing tag TAG[1]. For the example instance shown by FIG. 6, ten sensors, namely S[2], S[3], S[12], S[14], S[15], S[17], S[23], S[26], S[33], & S[36], are reporting RSSI values with sequence number M from TAG[1] as below:

$$\begin{pmatrix} S_2 & S_3 & S_{12} & S_{14} & S_{15} & \dots & \dots & S_{36} \\ RSSI_2 & RSSI_3 & RSSI_{12} & RSSI_{14} & RSSI_{15} & \dots & \dots & RSSI_{36} \end{pmatrix} \tag{1}$$

Figure 7:
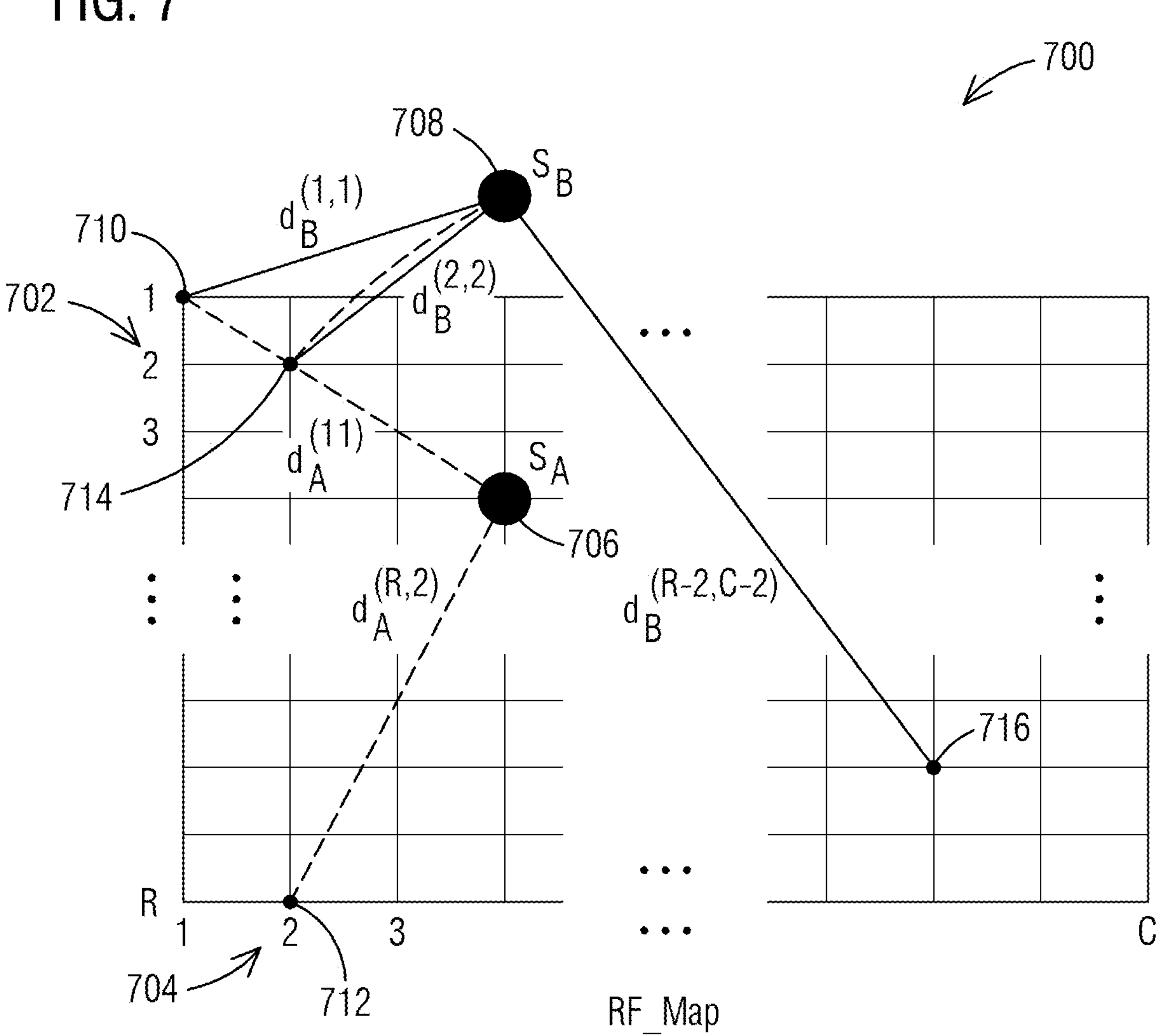
FIG. 7 depicts an example implementation of an RSSI probability map.

Referring to FIG. 7, there is shown an example implementation of an RSSI probability map. The RSSI probability map may be generated from the matrix [1] above based on the known locations of the receiving devices. The RSSI probability map includes R by C grid points distributed evenly at the TAG plane. R represents the number of rows 702, C represents the number of columns 704, and the TAG plane is located at a particular TAG height. The R by C grid points are positioned a certain distance apart by default, such as 1 foot or some other convenient length. For some embodiments, the last known location of the beaconing tag is used to anchor the RSSI probability map, with a pre-determined window size for RSSI probability map. For some embodiments, other TAG related information may be used to anchor the RSSI probability map. The distances from each receiving device to all map grid points are computed and paired with the received RSSI values for the receiving devices. For each receiving device, there are R by C different distances and one RSSI.

FIG. 7 demonstrates the use of two example sensors, namely $S_A$ 706 and $S_B$ 708. For sensor $S_A$ 706, the distances from its location ($x_A$, $y_A$, $z_A$) to all RSSI probability map grid points ($x_{ij}$, $y_{ij}$, $z_{ij}$) are computed and paired with the $RSSI_A$ to form an array of distance-RSSI. For example, $$d_A^{(1,1)}$$

represents the distance from $S_A$ 706 to map location (1, 1) 710 and $$d_A^{(R,2)}$$

represents the distance from $S_A$ to map location (R, 2) 712. Each of these distances are associated with the $RSSI_A$ to for the distance-RSSI array, as represented by the following formula (2):

$$\text{dist\_RF}_A = \begin{pmatrix} d_A^{(1,1)} & d_A^{(1,2)} & d_A^{(1,3)} & \ldots & d_A^{(R,C-1)} & d_A^{(R,C)} \\ RSSI_A & RSSI_A & RSSI_A & \ldots & RSSI_A & RSSI_A \end{pmatrix} \quad (2)$$

where, $$d_A^{(i,j)} = \sqrt{(x_A - x_{ij})^2 + (y_A - y_{ij})^2 + (z_A - z_{ij})^2} - \text{MD\_OFFSET}$$

where MD_OFFSET is constant value. In particular, the Minimum Distance Offset (MD_OFFSET) is determined, at least in part, by the ceiling height and the tag's use model. Thus, MD_OFFSET modifies the distance used for the lookup table. A distance-RSSI array for sensor $S_B$ 708 and other receiving sensors may be generated in a similar way. For example, $$d_B^{(1,1)}$$

represents the distance from $S_B$ 708 to map location (1, 1) 710, $$d_B^{(2,2)}$$

represents the distance from $S_B$ to map location (2, 2) 714, and $$d_A^{(R-2,C-2)}$$

represents the distance from $S_A$ to map location (R-2, C-2) 716.

Figure 8A:
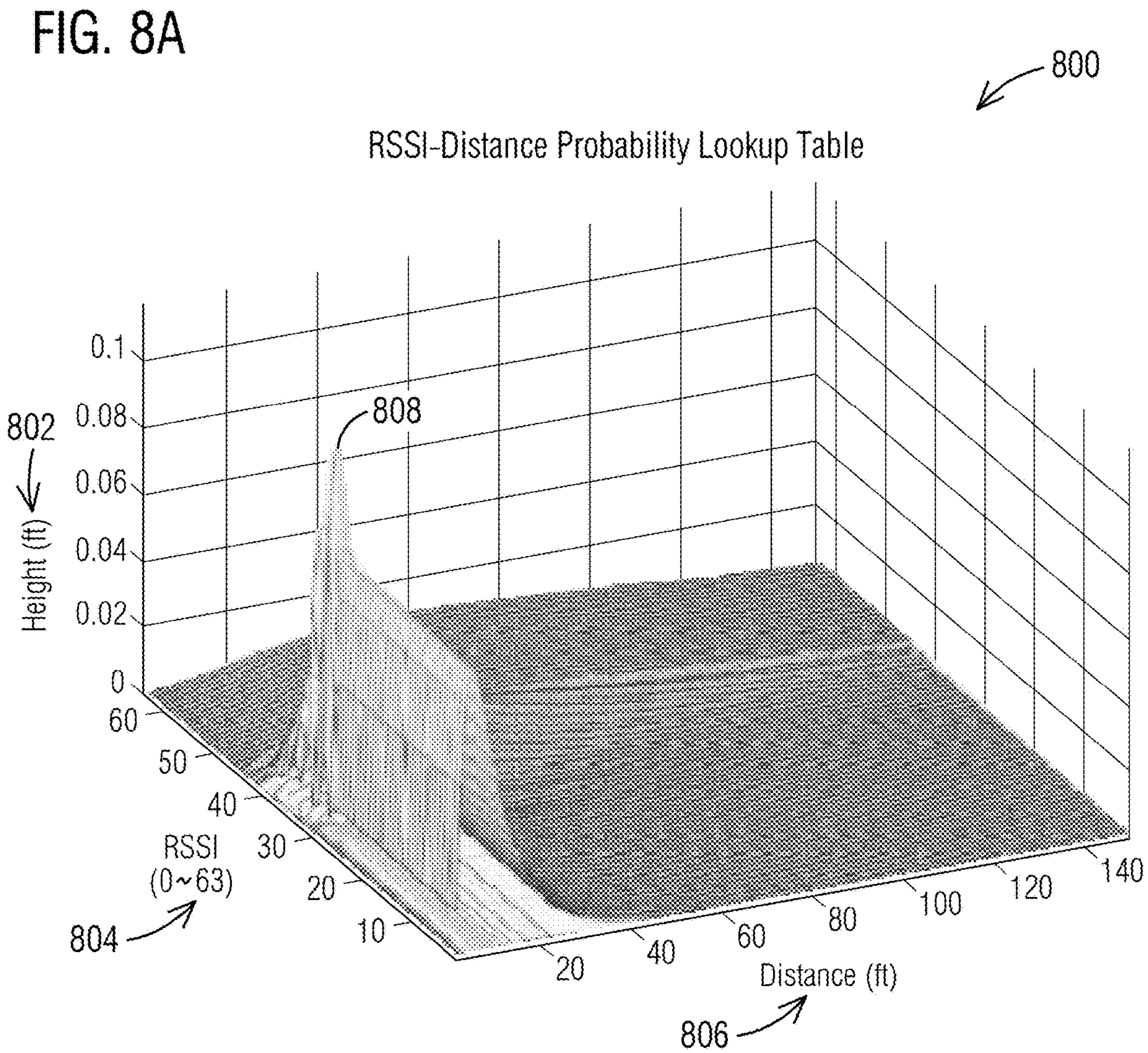
FIGS. 8A and 8B are graphical views of example implementations of lookup tables for RSSI-distance probability.
Figure 8B:
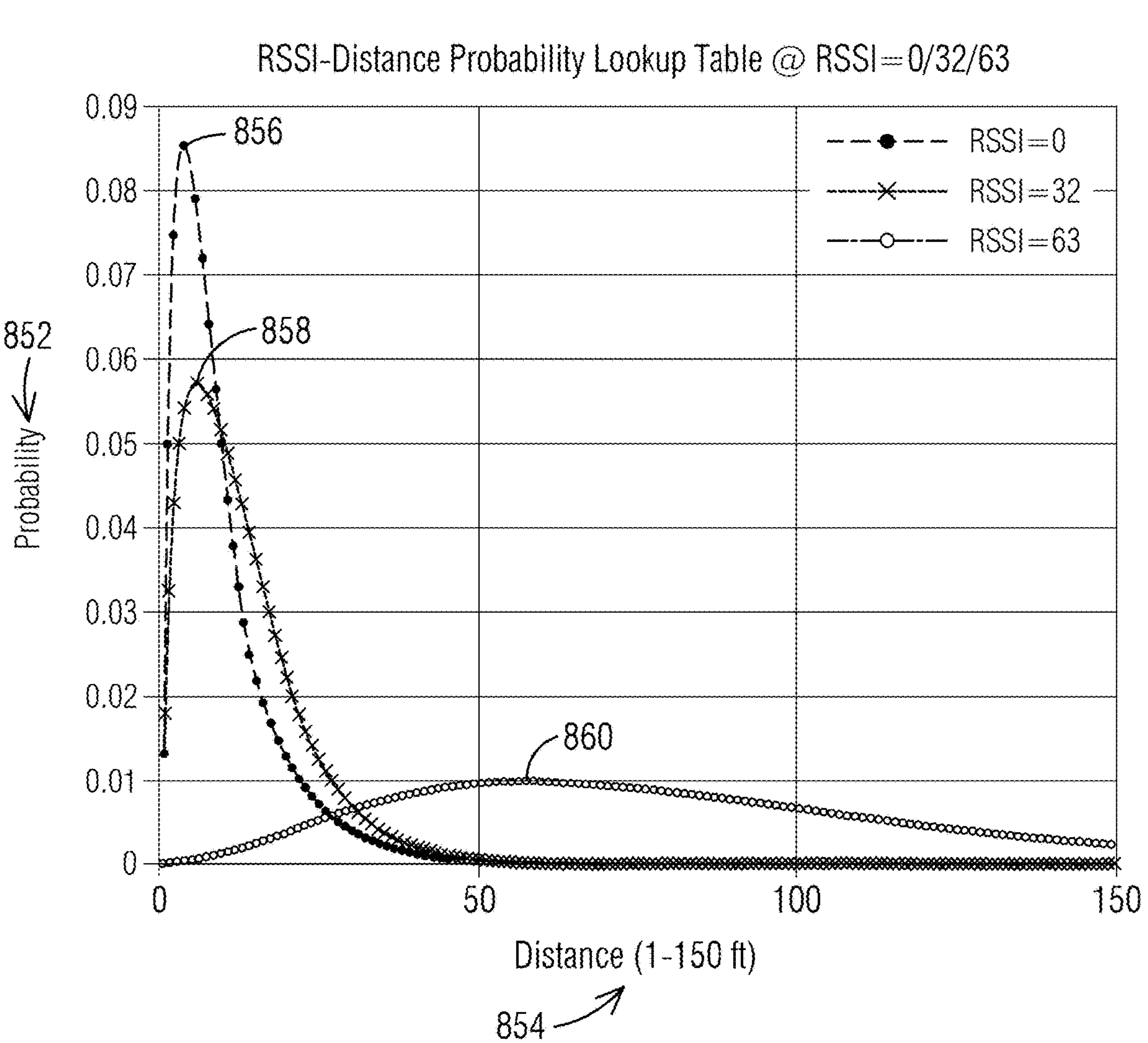

Referring to FIGS. 8A and 8B, there are shown graphical views of example implementations of lookup tables for RSSI-distance probability. FIG. 8A represents a three-dimensional sensor-tag lookup table 800 of RSSI-distance probability and FIG. 8B represents a two-dimensional sensor-tag lookup table of RSSI-distance relationship at RSSI values of 0 dBm, 32 dBm, and 63 dBm. A lookup table establishes a unique probabilistic relationship between the RSSI's and the distances for a particular receiving device (sensor) and tag combination. For the example shown in FIG. 8A, each probability value 802 in the lookup table 800 represents the expected probability for a particular RSSI-distance combination. The three-dimensional lookup table 800 includes a two-dimensional RSSI-distance layer, such as 64 by 150 grid. Each grid row 804 of the lookup table 800 represents an RSSI value, such as 0 to 63, and each grid column 806 represents the sensor-tag distance, such as 0 to 149 ft. For example, the lookup table 800 may identify the peak location 808 for RSSI=35.

FIG. 8B depicts an RSSI-distance probability lookup table 850 similar to the lookup table 800 of FIG. 8A. The lookup table 850 of FIG. 8B more clearly shows, in two-dimensions, the differing RSSI-distance relationships at specific RSSI values, namely 0 dBm, 32 dBm, and 63 dBm. The expected probability 852 is shown relative to the distance 854 for the specified RSSI value 856, 858, 860. As shown in FIG. 8B, the y-axis 852 of the lookup table 850 represents the expected probability values, such as 0 to 0.09, and the x-axis 854 represents the sensor-tag distance, such as 0 to 150 ft. The three curves shown in the graphical view include a first set of probability values 856 over various distances for RSSI=0, a second set of probability values 858 for RSSI=32, and a third set of probability values 860 for RSSI=63. The peak value of the first set of probability values 856 for the RSSI-distance combination at RSSI=0 is higher than the peak values of the second and third sets of probability values at RSSI=32 (858) and RSSI=63 (860), respectively. In this manner, the lookup table 850 may identify the peak location of the RSSI-distance layer having the highest probability value 802 when specific RSSI values are considered.

FIGS. 8A and 8B demonstrate example implementations of particular lookup tables. These lookup tables represent specific sensor-tag combinations that shows some general characteristics of the RSSI-Distance lookup tables. Since the lookup tables 800, 850 are probability of distances at various RSSI values, each row's sum for each RSSI value should be 1. In practice, since the maximum distance is set (such as 150 feet), and in theory, the distance can go to infinity, the sum of each row should be very close to, but slightly less than 1. Also, parts of the tables 800, 850 are much sharper, i.e., have more pointed peaks and narrower spreads. In general, the stronger the RSSI, the tighter the RSSI-distance distribution. The main reason is that the stronger the RSSI, the closer the tag's distance to the sensor and the less possibility of spreading, deflection, multipath, and all other interferences that changes the RSSI. Further, an optimized RSSI (for example, RSSI around 35 for tables 800, 850) has the sharpest peak, indicating the highest possibility of RSSI-distance certainty. For some situations, this sharpest peak may result from the sensor and tag have a direct line-of-sight. In addition, when the RSSI is weaker (such as, less than 45), the distance from tag to sensor is most likely more than a threshold distance (such as 50 feet away). The fluctuation of RSSI is more severe due to the increasing number of reflection paths and other noise sources.

As described in equation (2) above, each receiving device generates a (R×C) matrix with the received RSSI and the receiving sensor's distances to all grid points in the RSSI probability map. Each RSSI-distance pair produces an expected probability for the tag at that grid point in RSSI probability map. All RSSI-distance pairs, therefore, create an RSSI probability map for the receiving sensor.

Figure 9A:
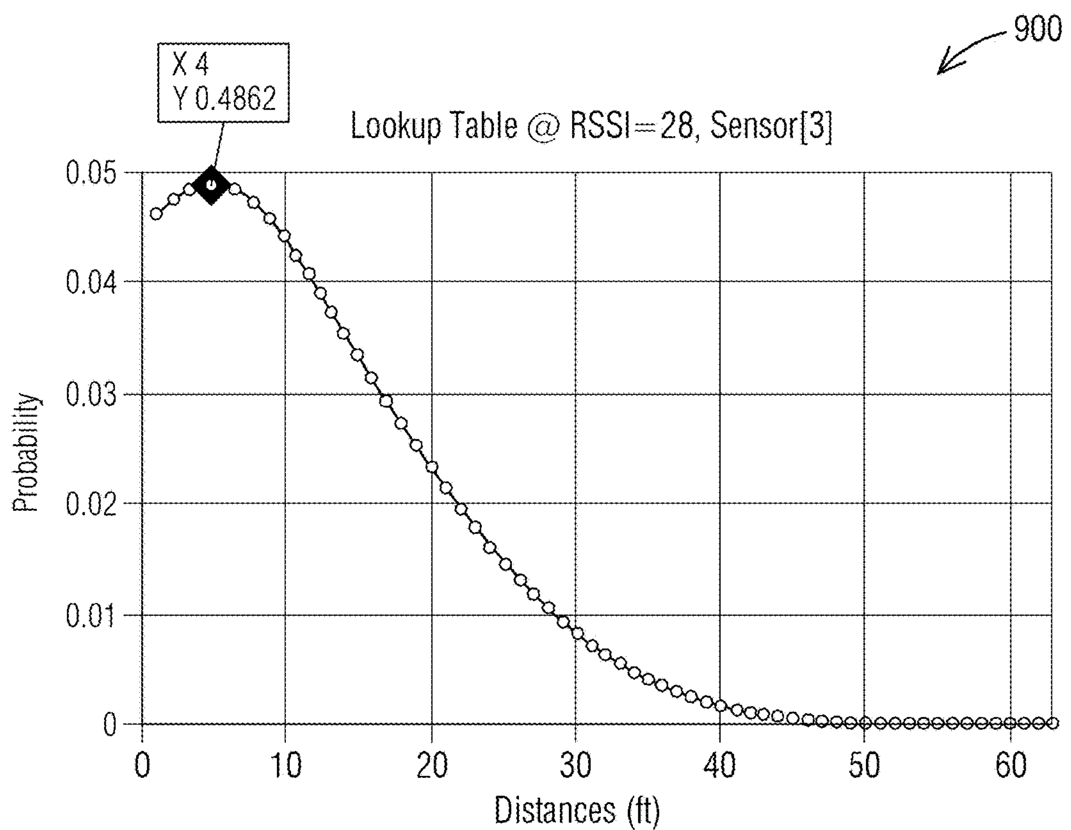
FIGS. 9A-9F are graphical views of example implementations of lookup tables, device distances, and RSSI probability maps, for specific receiving devices.
Figure 9B:
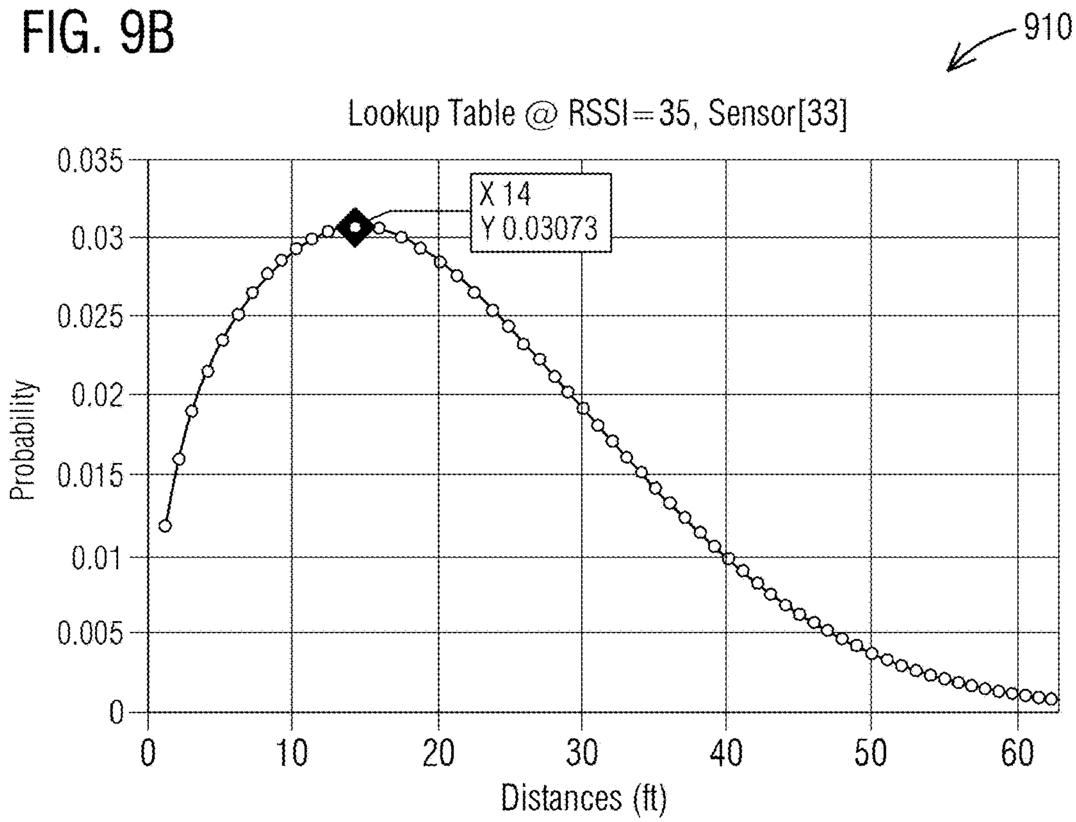
Figures 9C, 9D:
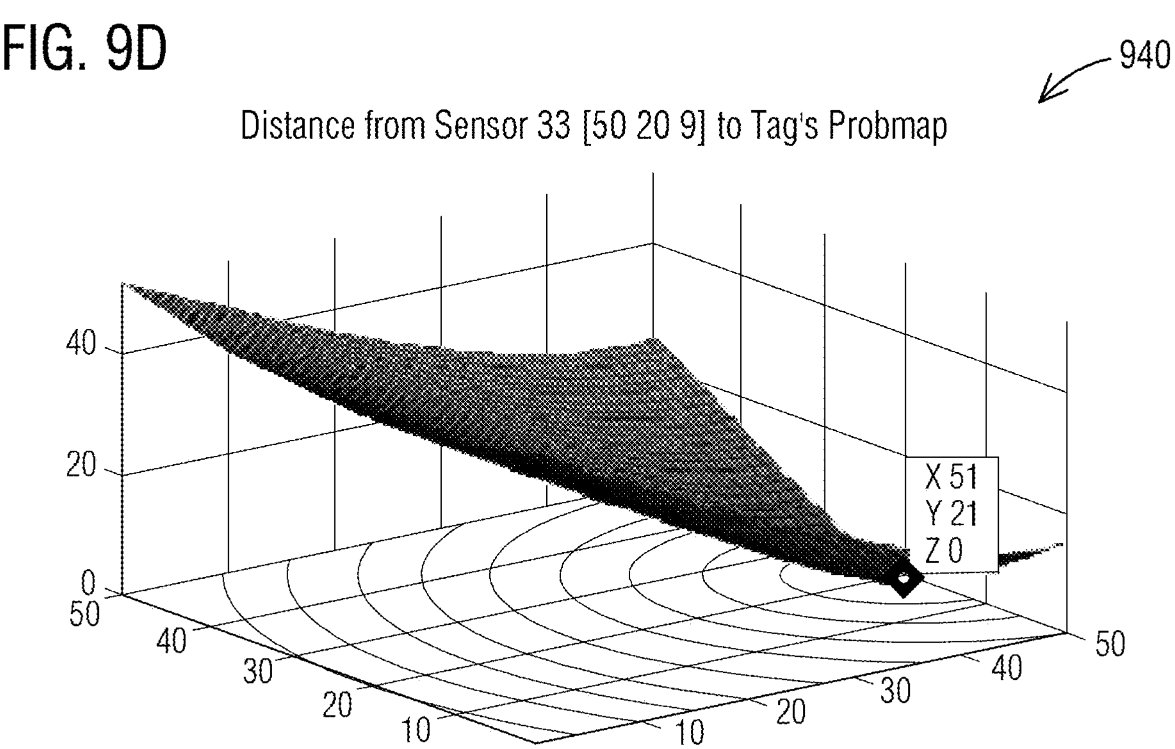
Figure 9E:
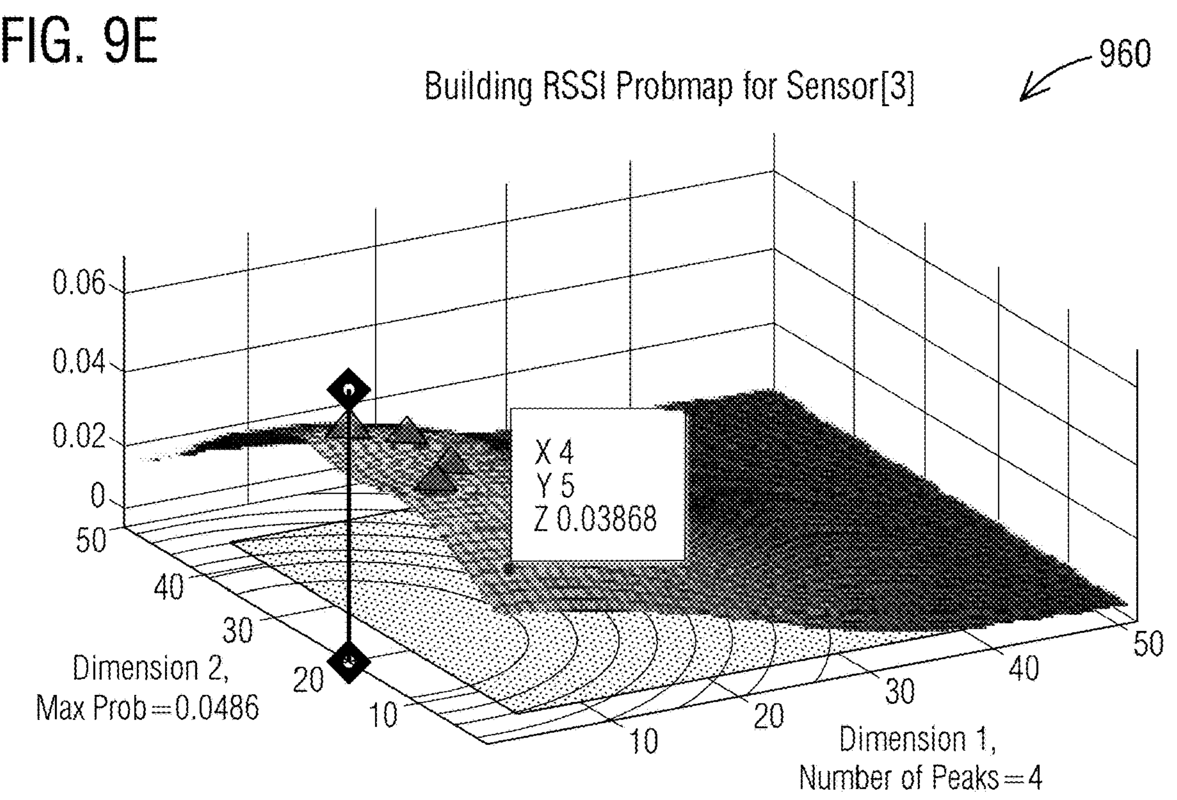
Figure 9F:
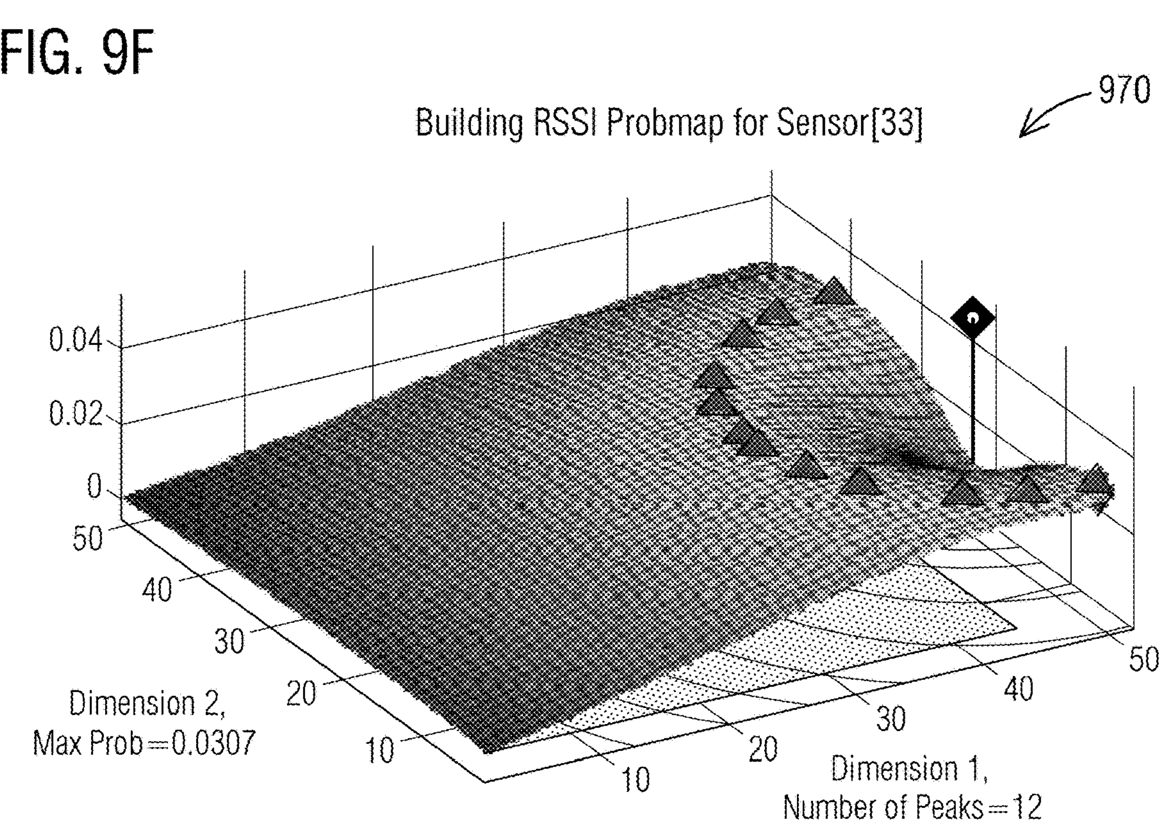

Referring to FIGS. 9A-9F, there are shown graphical views of example implementations of lookup tables, device distances, and RSSI probability maps, for specific receiving devices. FIGS. 9A-9F represent the RSSI probability maps for two different receiving devices or sensors. In particular, sensor [3] of FIG. 6 is represented by graphic views 900, 930, 960 of FIGS. 9A, 9C, and 9E, and sensor of FIG. 6 is represented by graphic views 910, 940, 970 of FIGS. 9B, 9D, and 9F. Sensor [3] is at location [0 20 9] with $RSSI_3$=28, and sensor is at location [50 20 9] with $RSSI_{33}$=35. The subplots of the top graphic views 900, 910 of FIGS. 9A and 9B are the lookup table rows for sensor [3] and sensor [33]. The subplots of the middle graphic views 930, 940 of FIGS. 9C and 9D are the distances from each sensor to all the tag sub-plane, MD_OFFSET adjusted. The subplots of the bottom graphic views 960, 970 of FIGS. 9E and 9F are the RSSI probability maps constructed after using the lookup tables in FIGS. 8A and 8B. In the subplots of the bottom graphic views 960, 970, the virtual line aligned with diamonds is the sensor in which the subspace underneath is the RSSI probability map. In general, the sensor RSSI probability maps may have a donut-like shaped surface when viewed in three dimensions. The triangle markers represent the peak probability ring of the RSSI probability map.

The above process repeats for each receiving sensor. After N receiving sensor's RSSI probability map is generated, the final RSSI probability map is the product of all the individual RSSI probability maps.

Figure 10:
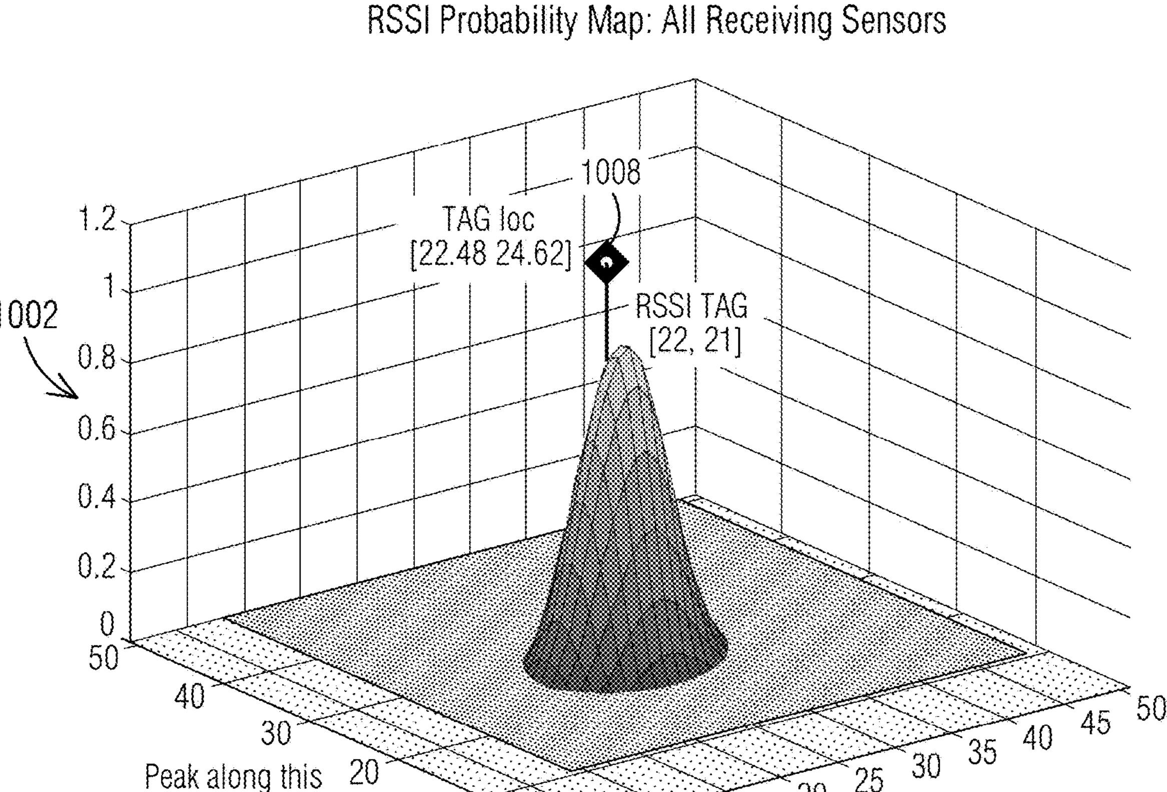
FIG. 10 is a graphical view of an example implementation of a final RSSI probability map and RSSI extracted tag location.

Referring to FIG. 10, there is shown a graphical view of an example implementation of a final RSSI probability map and RSSI extracted tag location. This graphic view includes final probability values 1002 as well as final peaks 1004, 1006 in different directions for the RSSI extracted from the tag location. The tag location may be determined from the RSSI probability map. The value at each grid point is the likelihood of the tag being at that particular location. The RSSI probability map has R×C probability values. The maximum likelihood 1008 of all the probabilities is the current tag location base on RSSI. It is to be noted that the accuracy of the tag location may be subject to variation in the RSSI. As noted above, for some embodiments, the RSSI probability map may be combined with one or more other probability maps to increase the tag location's accuracy and precision.

As an example, FIG. 10 may represent the final RP_map from all ten sensors that report RSSIs in FIG. 6. The actual location of the TAG may be [22.48 24.62] in the original building coordinate system. The RSSI probability map tag location may be [22 21] in the RSSI probability map coordinate system based on the receiving RSSIs from ten sensors. For this example, there may be an error, such as about 3.65 feet. The tag location accuracy may improve using one or more other probability maps, such as the distance probability map, motion map, and other topography probability maps. However, the RSS-distance based probability map in the environment is the only probability map that has a direct association to the tag location, or the change of the tag locations. Other probability maps may only restrain and reduce location errors; they do not provide updated information for the tag's location changes. Accordingly, the differential RSSI signals inherently reduces the mean of the statistical random errors further.

The order of the differential signal is "first" order, which is $$d1(n)=x(n+1)-x(n) \tag{3}$$

The second order differential signal is the difference of the difference signal, which is defined as:

$$d2(n)=[x(n+2)-x(n+1)]-[x(n+1)-x(n)]=x(n+2)-2*x(n+1)+x(n) \tag{4}$$

The first-order difference is related to "displacement", and $2^{nd}$ order difference is associated with displacement changes or acceleration. The location may be predicted with more precision if it is determined based on displacement (speed) and accelerations. Thus, the differential RSSI may also measure speed, which provides another dimension of probability map that provides critical information of tracking.

Figure 11:
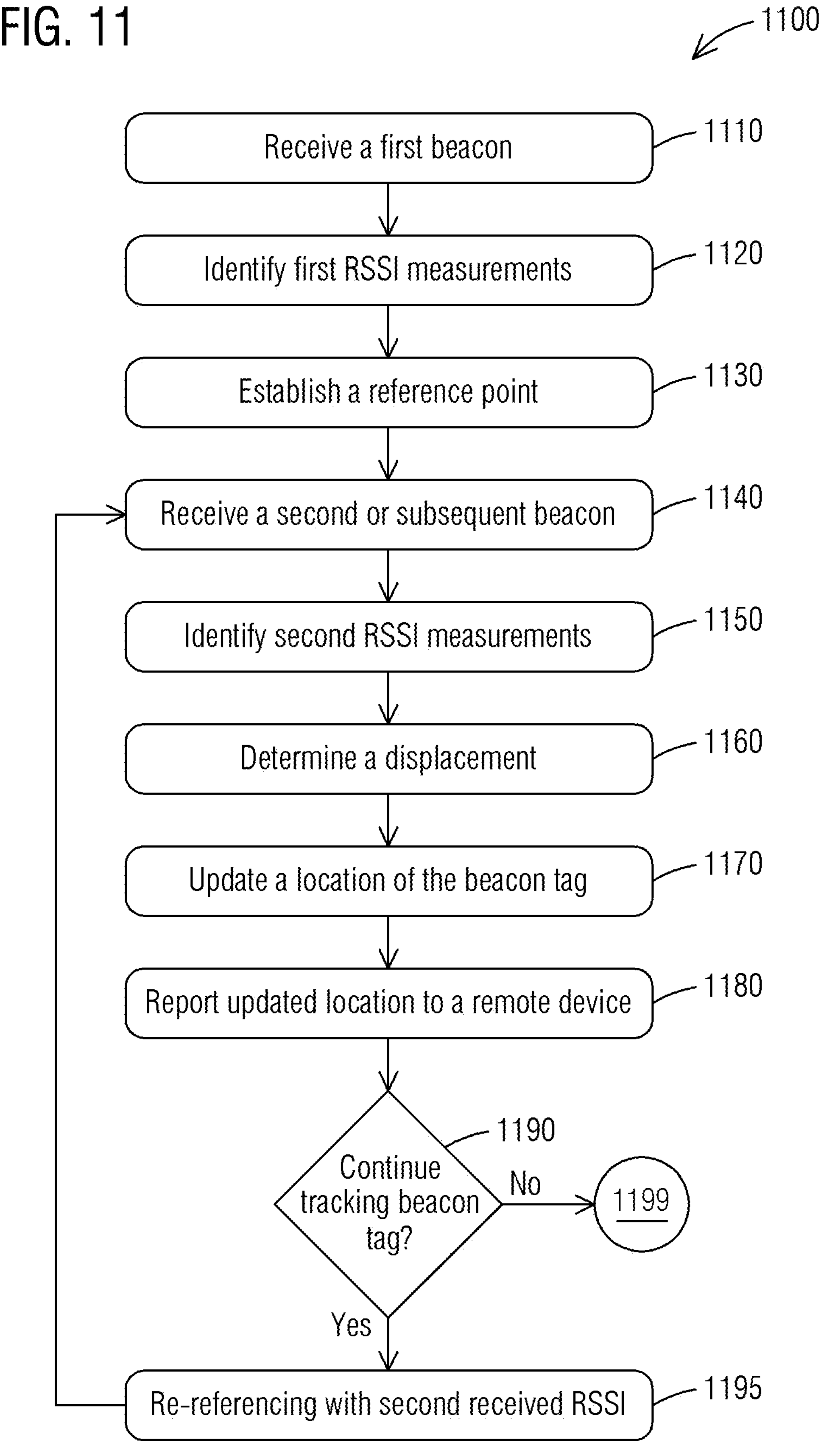
FIG. 11 is a flow diagram of a system operation in an example implementation that is operable to employ techniques described herein.

Referring to FIG. 11, there is shown a flow diagram of a system operation 1100 in an example implementation that is operable to employ techniques described herein. The system operation 1100 is a method for location determination of a beacon tag using signal differential. A first beacon is received (1110) at multiple receiving devices, such as sensors having beacon receiving capabilities. In response to receiving (1110) the first beacon, first received signal strength indicator measurements associated with the receiving devices are identified (1120) based on the first beacon. A reference point for the beacon tag is established (1130) based on the first received signal strength indicator measurements. Subsequent beacons, such as a second beacon, may be received (1140) at the receiving devices. The subsequent beacons are similar to the first beacon but received subsequent to the first beacon. In response to receiving (1140) a subsequent beacon (such as the second beacon), second received signal strength indicator measurements received at the receiving devices are identified (1150) based on the second beacon.

A displacement of the beacon tag may be determined (1160) based on a first order difference of the second received signal strength indicator measurements to the first received signal strength indicator measurements. The displacement may be determined (1160) in response to identifying (1150) the second received signal strength indicator measurements. In response to determining (1160) the displacement, the location of the beacon tag relative to the reference point may be updated (1170) based on the displacement. For some embodiments, the location of the beacon tag relative to the reference point is updated in response to determining that a preset condition has been met. For some embodiments, the updated location may be reported or otherwise communicated (1180) to a remote device. Examples of the remote device include, but are not limited to, the receiving devices 110, the location determination hub 112, and the gateways 114.

The beacon tag may be tracked in real-time by repeating (1190) the process above for subsequent beacons. In order to continue the process, the system 100 re-references (1195) with the second received RSSI. For one embodiment, the system 100 may re-establish the reference point after a predetermined number of displacement measurements. For another embodiment, the system 100 may determine to trigger a re-referencing after the accumulated displacement reaches a particular threshold. Thereafter, the second RSSI becomes the first RSSI after displacement is completed. The first RSSI is used to establish the reference point, and the subsequently incoming RSSI become second RSSI. The first order difference RSSI is determined as: $difference\_RSSI=RSSI_2-RSSI_1$. Thereafter, the previous second RSSI becomes the current first RSSI and the incoming RSSI becomes the current second RSSI.

In particular, a subsequent beacon may be received from the beacon tag by the receiving devices (1140), subsequent received signal strength indicator measurements may be identified (1150) by the receiving devices, a subsequent displacement may be determined (1160), and the location of the beacon tag may be updated (1170) based on the subsequent displacement. Otherwise, where the beacon tag will no longer be tracked, the system may perform (1199) other function or otherwise terminate the system operation 1100. For some embodiments, the system may further determine a speed of the beacon tag based on the first order difference of the second received signal strength indicator measurement to the first received signal strength indicator measurement and the time differences between the second received signal strength indicator and the first received signal strength indicator.

Figure 12:
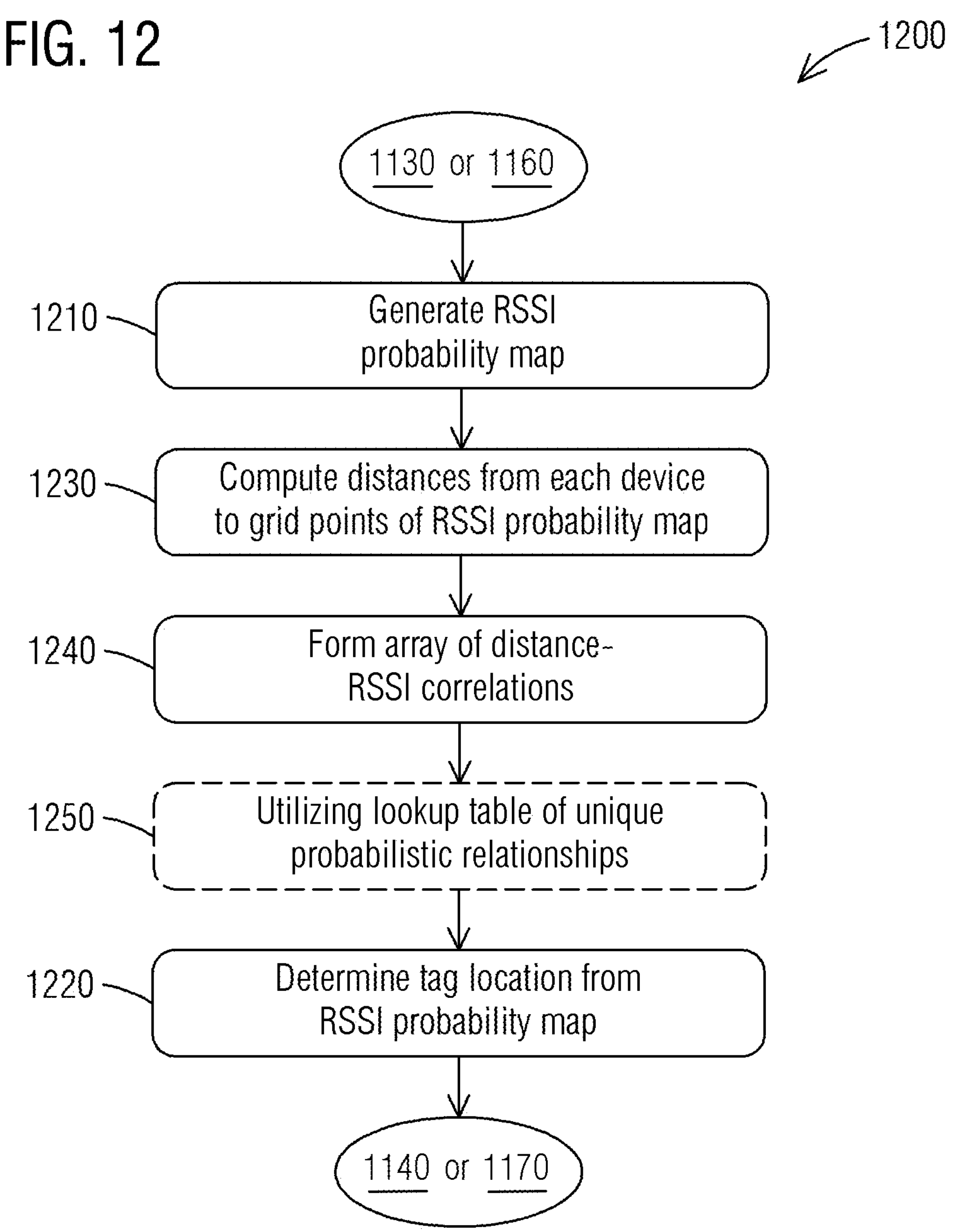
FIG. 12 is a flow diagram of representing example implementations of the establishment or determination portions of the system operation of FIG. 10.

Referring to FIG. 12, there is shown a flow diagram of representing example implementations of the establishment or determination portions 1200 of the system operation of FIG. 11. The portions 1200 of the system operation 1100 may occur at the establishment (1130) of the reference point, the determination (1160) of the displacement, or both. In particular, establishing (1130) the reference point for the beacon tag may include generating (1210) an RSSI probability map from a matrix of the first received signal strength indicator measurements and determining (1220) a first tag location from the RSSI probability map for some embodiments. Similarly, determining (1160) the displacement of the beacon tag may include generating (1210) a second RSSI probability map from a matrix of the second received signal strength indicator measurements and determining (1220) a second tag location from the second RSSI probability map based on the first order difference of the second received signal strength indicator measurement to the first received signal strength indicator measurement for some embodiments.

In addition to generating (1210) an RSSI probability map and determining (1220) a tag location, for some embodiments, the portions 1200 of the system operation 1100 may perform further operations (1230, 1240, 1250). For some embodiments, establishing (1130) the reference point for the beacon tag may include computing (1230) distances from each receiving device to grid points of the RSSI probability map, and forming (1240) an array of distance-RSSI correlations for each receiving device. Likewise, for some embodiments, determining (1160) the displacement of the beacon tag may include computing (1230) distances from each receiving device to grid points of the second RSSI probability map, and forming (1240) an array of distance-first order difference RSSI correlations for each receiving device.

For some embodiments, a lookup table of unique probabilistic relationships between the received signal strength indicator measurements and the computed distances for one or more tag-device combinations may be utilized (1250). A distance-to-RSSI lookup table for a particular sensor-tag combination may be established in advance. The process for establishing the lookup table includes collecting data points at controlled environment.

In reference to FIGS. 5 and 12 together, the establishment (1130) of the reference point for the beacon tag may include revising the first tag location based on at least one non-RSSI probability map. Similarly, the determination (1160) of the displacement of the beacon tag may include revising the second tag location based on at least one non-RSSI probability map. Examples of other likelihood maps include, but are not limited to, a distance likelihood map 510, an RF likelihood map 520, a motion likelihood map 530, a structure likelihood map 540, and other likelihood maps (550).

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A system for location determination of a beacon tag using signal differential comprising:

an input component configured to receive a first beacon at a plurality of receiving devices and receive a second beacon at the plurality of receiving devices, the second beacon being received subsequent to the first beacon;

a processor coupled to the input component, the processor to:

identify a plurality of first received signal strength indicator measurements associated with the plurality of receiving devices based on the first beacon;

establishing a reference point for the beacon tag based on the plurality of first received signal strength indicator measurements;

identifying a plurality of second received signal strength indicator measurements associated with the plurality of receiving devices based on the second beacon;

determining a displacement of the beacon tag based on a first order difference of the second received signal strength indicator measurements to the first received signal strength indicator measurements, determining the displacement including reducing a mean interference based on the first order difference by canceling out interference components within the received signal strength indicator measurements during the first order difference calculation; and updating a location of the beacon tag relative to the reference point based on the displacement.

2. The system as described in claim 1, wherein the processor establishes the reference point for the beacon tag by:

generating an RSSI probability map from a matrix of the plurality of first received signal strength indicator measurements; and determining a first tag location from the RSSI probability map.

3. The system as described in claim 2, wherein the processor establishes the reference point for the beacon tag by:

computing distances from each receiving device to a plurality of grid points of the RSSI probability map; and forming an array of distance-RSSI correlations for each receiving device.

4. The system as described in claim 2, wherein the processor establishes the reference point for the beacon tag by revising the first tag location based on at least one non-RSSI probability map.

5. The system as described in claim 1, wherein the processor determines the displacement of the beacon tag by:

generating a second RSSI probability map from a matrix of the plurality of second received signal strength indicator measurements; and determining a second tag location from the second RSSI probability map based on the first order difference of the second received signal strength indicator measurement to the first received signal strength indicator measurement.

6. The system as described in claim 5, wherein the processor determines the displacement of the beacon tag by:
computing distances from each receiving device to a plurality of grid points of the second RSSI probability map; and
forming an array of distance-first order difference RSSI correlations for each receiving device.

7. The system as described in claim 5, wherein the processor determines the displacement of the beacon tag by revising the second tag location based on at least one non-RSSI probability map.

8. The system as described in claim 1, wherein the processor updates the location of the beacon tag relative to the reference point in response to determining that a preset condition has been met.

9. The system as described in claim 1, wherein the processor tracks the beacon tag in real-time by receiving a subsequent beacon, identifying a plurality of subsequent received signal strength indicator measurements, determining a subsequent displacement, and updating the location based on the subsequent displacement.

10. The system as described in claim 1, wherein the processor determines a speed of the beacon tag based on the first order difference of the second received signal strength indicator measurement to the first received signal strength indicator measurement.

11. A method for location determination of a beacon tag using signal differential comprising:
receiving a first beacon at a plurality of receiving devices;
identifying a plurality of first received signal strength indicator measurements associated with the plurality of receiving devices based on the first beacon;
establishing a reference point for the beacon tag based on the plurality of first received signal strength indicator measurements;
receiving a second beacon at the plurality of receiving devices, the second beacon being received subsequent to the first beacon;
identifying a plurality of second received signal strength indicator measurements at the plurality of receiving devices based on the second beacon;
determining a displacement of the beacon tag based on a first order difference of the second received signal strength indicator measurements to the first received signal strength indicator measurements, determining the displacement including reducing a mean interference based on the first order difference by canceling out interference components within the received signal strength indicator measurements during the first order difference calculation;
updating a location of the beacon tag relative to the reference point based on the displacement.

12. The method as described in claim 11, wherein establishing the reference point for the beacon tag includes:
generating an RSSI probability map from a matrix of the plurality of first received signal strength indicator measurements; and
determining a first tag location from the RSSI probability map.

13. The method as described in claim 12, wherein establishing the reference point for the beacon tag includes:
computing distances from each receiving device to a plurality of grid points of the RSSI probability map; and
forming an array of distance-RSSI correlations for each receiving device.

14. The method as described in claim 12, wherein establishing the reference point for the beacon tag includes revising the first tag location based on at least one non-RSSI probability map.

15. The method as described in claim 11, wherein determining the displacement of the beacon tag includes:
generating a second RSSI probability map from a matrix of the plurality of second received signal strength indicator measurements; and
determining a second tag location from the second RSSI probability map based on the first order difference of the second received signal strength indicator measurement to the first received signal strength indicator measurement.

16. The method as described in claim 15, wherein determining the displacement of the beacon tag includes:
computing distances from each receiving device to a plurality of grid points of the second RSSI probability map; and
forming an array of distance-first-order difference RSSI correlations for each receiving device.

17. The method as described in claim 15, wherein determining the displacement of the beacon tag includes revising the second tag location based on at least one non-RSSI probability map.

18. The method as described in claim 11, wherein updating the location of the beacon tag includes updating the location of the beacon tag relative to the reference point in response to determining that a preset condition has been met.

19. The method as described in claim 11, wherein the beacon tag is tracked in real-time by: receiving a subsequent beacon, identifying a plurality of subsequent received signal strength indicator measurements, determining a subsequent displacement, and updating the location based on the subsequent displacement.

20. The method as described in claim 11, further comprising determining a speed of the beacon tag based on the first order difference of the second received signal strength indicator measurement to the first received signal strength indicator measurement.

* * * * *